US008743504B1

(12) United States Patent
Bryant et al.

(10) Patent No.: US 8,743,504 B1
(45) Date of Patent: Jun. 3, 2014

(54) SERVOING ON ZONED CONCENTRIC SERVO SECTORS OF A FIRST DISK SURFACE TO WRITE A SPIRAL SERVO TRACK TO A SECOND DISK SURFACE (75) Inventors: Lawrence M. Bryant, Palo Alto, CA (US); Yun Hong, San Jose, CA (US); Charles A. Park, Aromas, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 9 days.

(21) Appl. No.: 13/558,243

(22) Filed: Jul. 25, 2012

(51) Int. Cl.
*G11B 5/596* (2006.01)

(52) U.S. Cl.
USPC ..................................... 360/78.14; 360/77.05

(58) Field of Classification Search
USPC ............... 360/77.05, 78.14, 75, 78.04, 77.04, 360/77.11, 48, 51, 275.3
See application file for complete search history.

(56) References Cited

U.S. PATENT DOCUMENTS

| | | | |
|---|---|---|---|
| 5,208,556 A | 5/1993 | Wilson | |
| 5,384,671 A | 1/1995 | Fisher | |
| 5,418,659 A | 5/1995 | Shergill | |
| 5,739,994 A | 4/1998 | Ottesen et al. | |
| 5,796,535 A | 8/1998 | Tuttle et al. | |
| 5,861,766 A | 1/1999 | Baumer et al. | |
| 5,956,196 A | 9/1999 | Hull et al. | |
| 6,028,727 A | 2/2000 | Vishakhadatta et al. | |
| 6,084,738 A | 7/2000 | Duffy | |
| 6,118,604 A | 9/2000 | Duffy | |
| 6,178,056 B1 | 1/2001 | Cloke et al. | |
| 6,262,857 B1 | 7/2001 | Hull et al. | |
| 6,388,829 B1 | 5/2002 | Nazarian | |
| 6,411,452 B1 | 6/2002 | Cloke | |
| 6,441,981 B1 | 8/2002 | Cloke et al. | |
| 6,519,104 B1 | 2/2003 | Cloke et al. | |
| 6,628,171 B1 | 9/2003 | Chou et al. | |
| 6,873,483 B2 | 3/2005 | Hetzler et al. | |
| 6,943,978 B1 | 9/2005 | Lee | |
| 6,992,856 B2 | 1/2006 | Ehrlich | |
| 7,006,316 B1 | 2/2006 | Sargenti, Jr. et al. | |
| 7,012,773 B2 | 3/2006 | Ashikaga et al. | |
| 7,035,026 B2 | 4/2006 | Codilian et al. | |
| 7,054,083 B2 | 5/2006 | Ehrlich | |
| 7,072,128 B2 | 7/2006 | Ehrlich | |
| 7,075,742 B2 | 7/2006 | Ehrlich | |
| 7,092,177 B2 | 8/2006 | Ehrlich | |
| 7,333,286 B2 * | 2/2008 | Jung et al. | 360/75 |
| 7,388,817 B2 | 6/2008 | Tsunoda | |
| 7,405,893 B2 | 7/2008 | Bi et al. | |
| 7,453,661 B1 | 11/2008 | Jang et al. | |
| 7,505,223 B1 * | 3/2009 | McCornack | 360/75 |
| 7,535,805 B2 | 5/2009 | Hsin | |
| 7,715,138 B1 | 5/2010 | Kupferman | |

(Continued)

*Primary Examiner* — Tan X Dinh (57) ABSTRACT

A disk drive is disclosed comprising a first head actuated over a first disk surface and a second head actuated over a second disk surface. A first servo sector of the first disk surface is read to generate a read signal which is processed to generate a first phase error. A first clock is generated at a frequency proximate a servo data rate of the first data sector. Read signal samples are synchronized in response to the first phase error and the first clock to generate synchronous samples, and servo data in the first servo sector is detected in response to the synchronous samples. The read signal is processed to generate a second phase error, a second clock is generated in response to the second phase error, and a spiral servo track is written to the second disk surface using the second clock.

20 Claims, 6 Drawing Sheets

(56) References Cited

U.S. PATENT DOCUMENTS

| | | |
|---|---|---|
| 7,729,074 B2 | 6/2010 | Venkataramani et al. |
| 7,813,065 B2 | 10/2010 | Annampedu et al. |
| 7,843,662 B1 | 11/2010 | Weerasooriya et al. |
| 7,929,238 B1 | 4/2011 | Vasquez |
| 8,022,774 B2 | 9/2011 | Ueno et al. |
| 8,031,429 B2 | 10/2011 | Gerasimov |
| 8,116,023 B1 | 2/2012 | Kupferman |
| 8,120,868 B2 | 2/2012 | Bi et al. |
| 8,213,106 B1 | 7/2012 | Guo et al. |
| 8,576,506 B1 | 11/2013 | Wang et al. |
| 2003/0086196 A1* | 5/2003 | Morris et al. ............. 360/75 |
| 2004/0160696 A1* | 8/2004 | Meyer ............. 360/77.05 |
| 2007/0047132 A1* | 3/2007 | Sado et al. ............. 360/77.01 |
| 2007/0064325 A1 | 3/2007 | Bi et al. |
| 2007/0081268 A1* | 4/2007 | Jung et al. ............. 360/73.01 |
| 2007/0211367 A1* | 9/2007 | Lau et al. ............. 360/75 |
| 2007/0211369 A1* | 9/2007 | Yang et al. ............. 360/75 |
| 2008/0002279 A1* | 1/2008 | Kouhara et al. ............. 360/75 |
| 2008/0239556 A1* | 10/2008 | Wiseman et al. ............. 360/77.08 |
| 2009/0086357 A1* | 4/2009 | Ehrlich ............. 360/55 |

* cited by examiner

SERVOING ON ZONED CONCENTRIC SERVO SECTORS OF A FIRST DISK SURFACE TO WRITE A SPIRAL SERVO TRACK TO A SECOND DISK SURFACE

BACKGROUND

Figure 1:
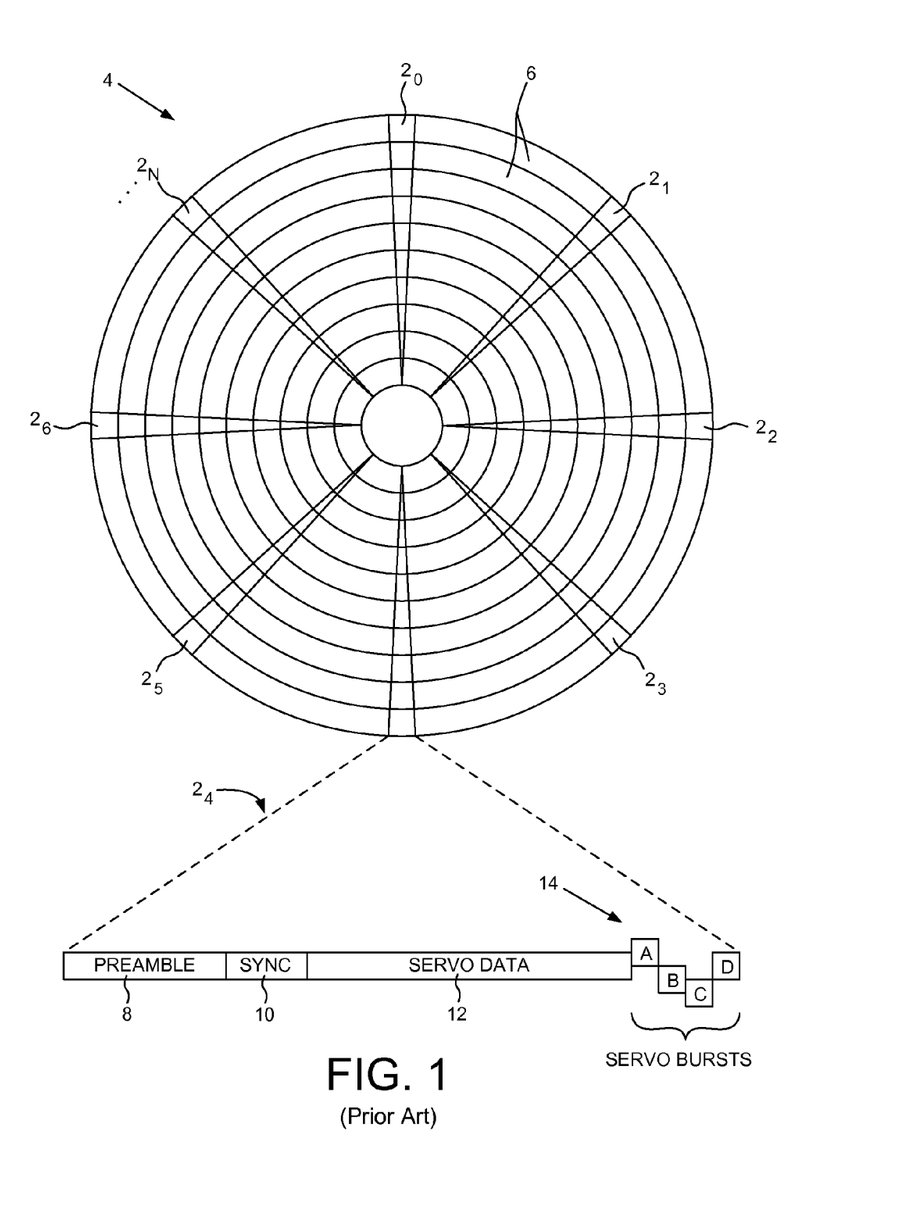
FIG. 1 shows a prior art disk format comprising a plurality of servo tracks defined by servo sectors.

When manufacturing a disk drive, concentric servo sectors $2_0$-$2_N$ are written to a disk 4 which define a plurality of radially-spaced, concentric servo tracks 6 as shown in the prior art disk format of FIG. 1. Concentric data tracks defined relative to the servo tracks 6 are partitioned into a plurality of data sectors, wherein the concentric servo sectors $2_0$-$2_N$ are considered "embedded" in the data sectors. Each servo sector (e.g., servo sector $2_4$) comprises a preamble 8 for synchronizing gain control and timing recovery, a sync mark 10 for synchronizing to a data field 12 comprising coarse head positioning information such as a track number, and servo bursts 14 which provide fine head positioning information. The coarse head position information is processed to position a head over a target track during a seek operation, and the servo bursts 14 are processed to maintain the head over a centerline of the target track while writing or reading data during a tracking operation.

In the past, external servo writers have been used to write the concentric servo sectors $2_0$-$2_N$ to the disk surface during manufacturing. External servo writers employ extremely accurate head positioning mechanics, such as a laser interferometer, to ensure the concentric servo sectors $2_0$-$2_N$ are written at the proper radial location from the outer diameter of the disk to the inner diameter of the disk. However, external servo writers are expensive and require a clean room environment so that a head positioning pin can be inserted into the head disk assembly (HDA) without contaminating the disk. Thus, external servo writers have become an expensive bottleneck in the disk drive manufacturing process.

The prior art has suggested various "self-servo" writing methods wherein the internal electronics of the disk drive are used to write the concentric servo sectors independent of an external servo writer. For example, U.S. Pat. No. 7,843,662 teaches a disk drive which performs a self-servo writing operation by writing a plurality of spiral servo tracks to the disk which are then processed to write the concentric servo sectors along a circular path. Each spiral servo track is written to the disk as a high frequency signal (with missing bits), wherein the position error signal (PES) for tracking is generated relative to time shifts in the detected location of the spiral servo tracks.

DETAILED DESCRIPTION

Figure 2A:
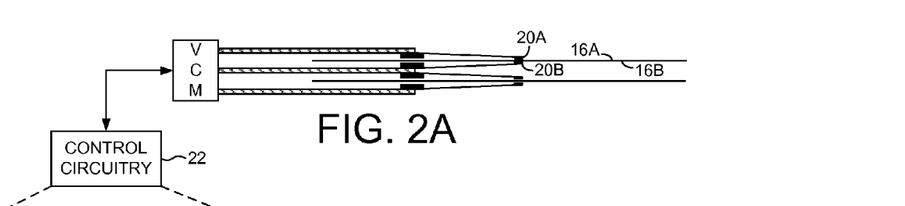
FIG. 2A shows a disk drive according to an embodiment of the present invention comprising a plurality of heads actuated over respective disk surfaces.
Figure 2B:
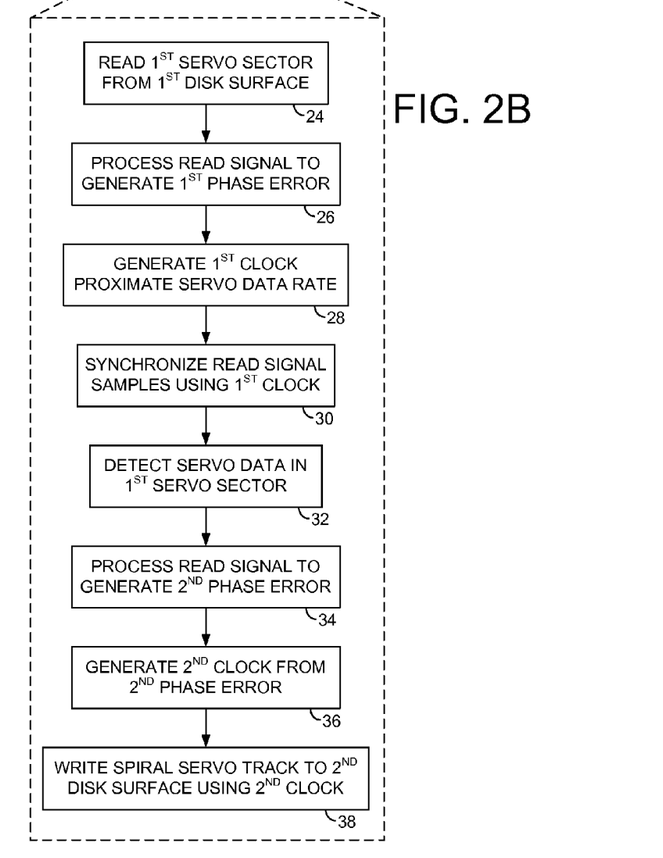
FIG. 2B is a flow diagram according to an embodiment of the present invention wherein first and second clocks are synchronized in response to the servo sectors on a first disk surface, the first clock is used to detect the servo data in the servo sectors, and the second clock is used to write a spiral servo track to the second disk surface.
Figure 3A:
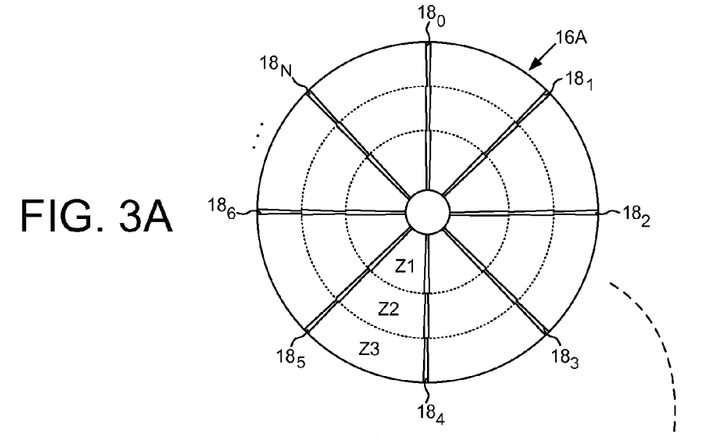
FIGS. 3A-3C illustrate an embodiment of the present invention wherein zoned servo sectors of a first disk surface are processed to write a spiral servo track on a second disk surface.

FIG. 2A shows a disk drive according to an embodiment of the present invention comprising a first disk surface 16A and a second disk surface 16B, wherein the first disk surface 16A comprises a plurality of servo sectors $18_0$-$18_N$ (FIG. 3A) defining a plurality of concentric servo tracks. The concentric servo tracks form a plurality of servo zones (e.g., Z1-Z3 in FIG. 3A) where a servo data rate of servo sectors in a first servo zone is different than a servo data rate of servo sectors in a second servo zone. The disk drive further comprises a first head 20A actuated over the first disk surface 16A and a second head 20B actuated over the second disk surface 16B, and control circuitry 22 operable to execute the flow diagram of FIG. 2B. A first servo sector is read from the first disk surface using the first head to generate a read signal (block 24). The read signal is processed to generate a first phase error (block 26), and a first clock is generated at a frequency proximate the servo data rate of the first data sector (block 28). The read signal samples are synchronized in response to the first phase error and the first clock to generate synchronous samples (block 30), and the servo data in the first servo sector is detected in response to the synchronous samples (block 32). The read signal is processed to generate a second phase error (block 34), and a second clock is generated in response to the second phase error (block 36). A spiral servo track is written to the second disk surface using the second head and the second clock (block 38).

In the example of FIG. 2A, the servo sectors on a top disk surface 16A are processed in order to write a spiral servo track on a bottom disk surface 16B of a first disk. However, in other embodiments the servo sectors on a first disk surface of a first disk may be processed in order to write a spiral servo track on a second disk surface of a second disk. In one embodiment, the servo sectors on a first disk surface may be processed in order to bank servo write a spiral servo track to a plurality of other disk surfaces. In an embodiment shown in FIG. 3B, a plurality of spiral servo tracks $40_0$-$40_N$ may be written to the second disk surface, and then the spiral servo tracks processed in order to write concentric servo sectors $42_0$-$42_N$ to the second disk surface as illustrated in FIG. 3C.

Figure 3B:
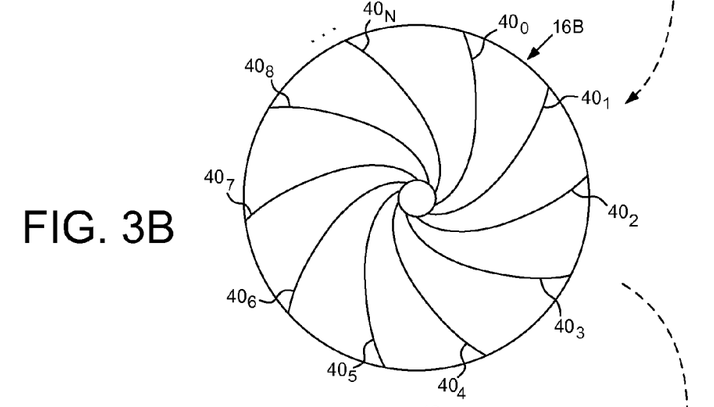
Figure 3C:
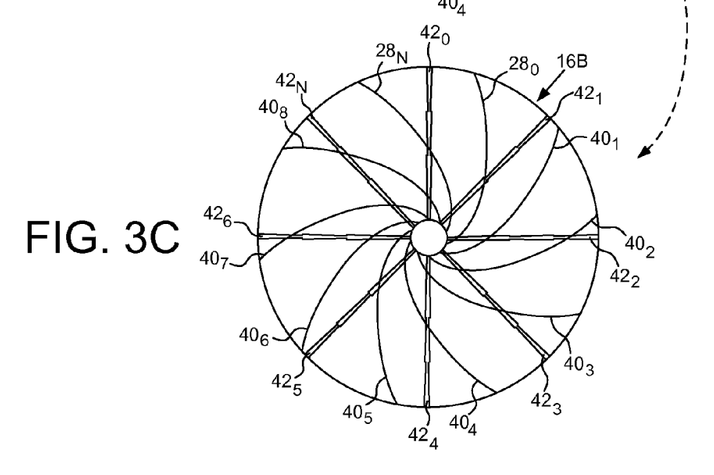
Figure 3D:
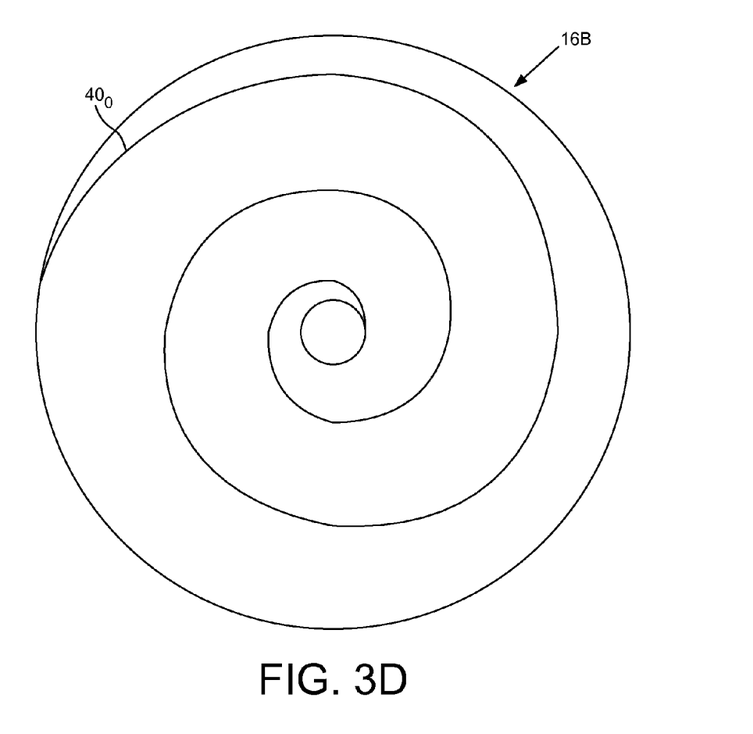
FIG. 3D shows an embodiment of the present invention wherein the spiral servo track is written over multiple disk revolutions.

Each spiral servo track $40_i$ in FIG. 3B is written by seeking the head from the outer diameter to the inner diameter of the disk (or vise versa) while writing the spiral servo track $40_i$ as the disk rotates. The seek speed of the heads and the rotation speed of the disk determine the slope of each spiral servo track. In the example shown in FIG. 3B, each spiral servo track $40_i$ is written over a partial disk revolution, wherein in another embodiment shown in FIG. 3D, each spiral servo track may be written over multiple disk revolutions (by decreasing the seek speed and/or increasing the disk rotation speed). Each spiral servo track $40_i$ may be written using any suitable pattern, and in one embodiment, each spiral servo track $40_i$ may comprise a high frequency pattern interrupted periodically by a sync mark.

In the prior art disk format shown in FIG. 1 the servo sectors $2_0$-$2_N$ are written at a constant data rate across the radius of the disk such that the servo sectors $2_0$-$2_N$ form a plurality of servo wedges from the outer diameter to the inner diameter of the disk. In the embodiment of the present invention shown in FIG. 3A, the servo sectors $18_0$-$18_N$ are written at a constant data rate across each servo zone (Z1-Z3) such that the servo sectors $18_0$-$18_N$ form servo wedges within each servo zone. The data rate is increased toward the outer diameter servo zones in order to decrease the area consumed by the servo sectors. However, when seeking the head across the disk surface shown in FIG. 3A, a transient in the timing recovery occurs when the head crosses a servo zone boundary due to the change in the servo data rate. It is desirable to mitigate the effect this timing transient may have on the spiral servo track written to the second disk surface while seeking the heads relative to the servo sectors $18_0$-$18_N$ recorded on the first disk surface.

Figure 4:
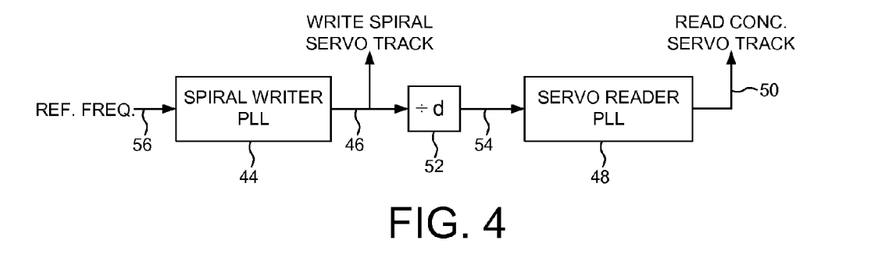
FIG. 4 shows an embodiment of the present invention wherein the first clock is generated in response to the second clock.

FIG. 4 shows an embodiment of the present invention wherein the control circuitry 22 of FIG. 2A comprises a second phase locked loop (PLL) 44 (e.g., spiral writer PLL as shown) operable to generate the second clock 46 used to write the spiral servo track to the second disk surface 16B, and a first PLL 48 (e.g., servo reader PLL as shown) operable to generate the first clock 50 in response to the second clock 46. In the embodiment of FIG. 4, the second clock 46 is scaled with a suitable divisor 52 to generate a third clock 54 used by the first PLL 48 to generate the first clock 50 substantially synchronized to the servo data rate of the current servo zone. The second PLL 44 generates the second clock 46 based on a reference frequency 56 generated by a crystal oscillator (not shown).

In the embodiment of FIG. 4, the second clock 46 used to write the spiral servo track to the second disk surface 16B comprises a substantially higher frequency than the first clock 50 used to read the servo sectors from the first disk surface 16A. That is, the spiral servo track is written to the second disk surface 16B at a substantially higher frequency than the servo sectors written to the first disk surface 16A. In another embodiment, the spiral servo track may be written to the second disk surface 16B at a substantially lower frequency than the servo sectors written to the first disk surface 16A. In the latter embodiment, the second servo clock 46 may be scaled with a suitable multiplier to generate the third clock 54 input into the second PLL 48. In either case, the divisor or multiplier scalars may be implemented as integer scalars or fractional scalars.

Synchronizing the first clock 50 in response to the servo sectors recorded on the first disk surface 16A ensures the servo data in the servo sectors can be recovered. Synchronizing the second clock 46 in response to the servo sectors recorded on the first disk surface 16A ensures the spiral servo track is written to the second disk surface 16B synchronous with the rotation of the disk. Cascading the PLLs 44 and 48 shown in FIG. 4 in order to generate the first clock 50 in response to the second clock 46 that are both synchronized to the servo sectors on the first disk surface 16A simplifies the cost and complexity of the timing recovery circuit.

Figure 5A:
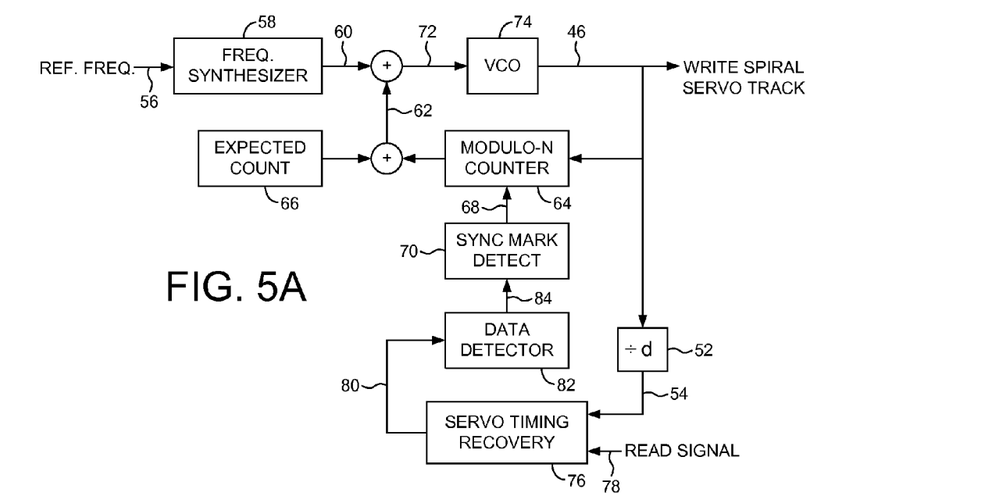
FIG. 5A shows an embodiment of the present invention wherein the second clock is generated using a frequency synthesizer and a voltage controlled oscillator synchronized in response to a phase error generated based on sync marks detected in the servo sectors.

FIG. 5A shows an embodiment of the present invention wherein the second PLL 44 of FIG. 4 for generating the second clock 46 comprises a frequency synthesizer 58 for generating a center frequency control signal 60 of an internal voltage controlled oscillator (VCO). The center frequency control signal 60 represents a nominal frequency for the second clock 46. A second phase error 62 is generated by comparing the output of a modulo-N counter 64 to an expected count 66 when a sync mark 68 is detected 70 in a servo sector on the first disk surface 16A. The modulo-N counter 64 is clocked by the second clock 46 such that the output of the modulo-N counter 64 when the sync mark is detected relative to the expected count 66 represents the second phase error 62 of the second PLL 44. The second phase error 62 is added to the center frequency control signal 60 to generate a frequency control signal 72 applied to a VCO 74 that generates the second clock 46 that is synchronized to the rotation of the disk (synchronized to the sync marks in the servo sectors on the first disk surface 16A).

The embodiment of FIG. 5A comprises a servo timing recovery component 76 which processes the read signal 78 emanating from the first head 20A over the first disk surface 16A in order to generate synchronous samples 80 at the servo data rate of the servo sectors. A data detector (e.g., a Viterbi detector) 82 processes the synchronous samples 80 in order to detect the servo data 84 in the servo sectors. A sync mark detector 70 processes the detected servo data 84 to detect the sync mark 68, for example, by correlating the detected servo data 84 with a target sync mark pattern.

Figure 6A:
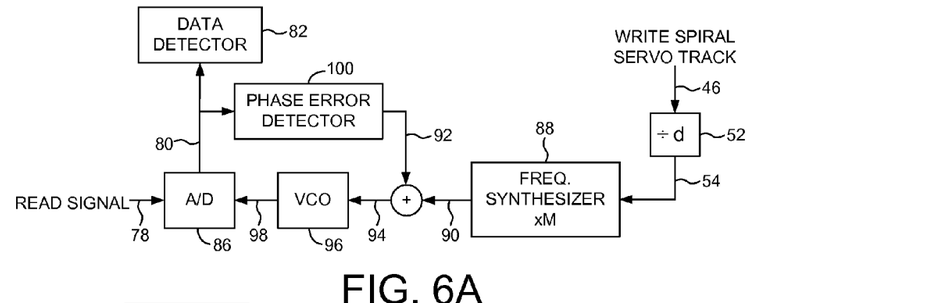
FIG. 6A shows an embodiment of the present invention wherein the read signal is sampled synchronously using the first clock synchronized to the data rate of the servo sectors.

The servo timing recovery component 76 may generate the synchronous samples 80 in any suitable manner. FIG. 6A shows an embodiment of the present invention wherein the servo timing recovery component 76 generates the synchronous samples 80 by synchronizing a sampling device 86 to the servo data rate of the servo sectors. In the embodiment of FIG. 6A, the second clock 46 is scaled by a divisor 52 to generate a third clock 54. A frequency synthesizer 88 generates a fourth clock using an internal VCO by scaling the third clock 54, where the scaling corresponds to a servo data rate of the current servo zone. The frequency synthesizer 88 generates a center frequency control signal 90 applied to the internal VCO for generating the fourth clock. The center frequency control signal 90 is added to a first phase error 92 to generate a frequency control signal 94 applied to a VCO 96 that generates a fifth clock 98 for clocking the sampling device 86. A phase error detector 100 processes the synchronous samples 80 to generate the first phase error 92, such as by comparing the synchronous samples 80 to expected samples of a target response (e.g., a partial response). The first phase error 92 adjusts the frequency control signal 94 so that the VCO 96 generates the fifth clock 98 synchronous to the servo data rate of the servo sectors.

When the first head 20A crosses a servo zone while seeking across the first disk surface 16A, the control circuitry adjusts the scaling in the frequency synthesizer 88 of FIG. 6A relative to the servo data rate of the new servo zone while continuing to clock the modulo-N counter 64 in FIG. 5A with the second clock 46. Adjusting the scaling factor of the frequency synthesizer 88 relative to the new servo zone will cause a transient in the synchronous timing recovery shown in FIG. 6A. However, this transient will not significantly affect the synchronous timing recovery shown in FIG. 5A so that the second clock 46 will continue to write the spiral servo track to the second disk surface 16B substantially synchronous with the rotation of the disk as the first head 20A crosses over the servo zones on the first disk surface 16A.

Figure 6B:
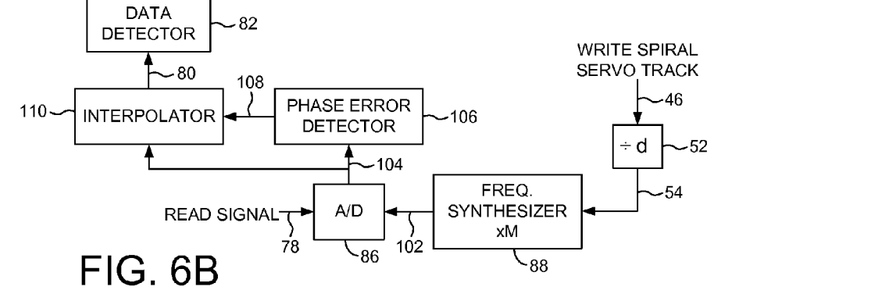
FIG. 6B shows an embodiment of the present invention wherein the read signal is sampled asynchronously using the first clock and the read signal samples interpolated to generate the synchronous samples.

FIG. 6B shows an alternative embodiment for implementing the servo timing recovery component 76 of FIG. 5A, wherein the synchronous samples 80 are generated using interpolated timing recovery. In this embodiment, the frequency synthesizer 88 outputs the fourth clock 102 having a nominal frequency proximate the servo data rate of the current servo zone. The fourth clock 102 is applied to the sampling device 86 which samples the read signal 78 asynchronously to generate asynchronous samples 104. The asynchronous samples 104 are processed by a phase error detector 106 to generate the first phase error 108. The first phase error 108 is processed by an interpolator 110 in order to interpolate the asynchronous samples 104 to generate the synchronous samples 80.

When the first head 20A crosses a servo zone while seeking across the first disk surface 16A, the control circuitry adjusts the scaling in the frequency synthesizer 88 of FIG. 6B relative to the servo data rate of the new servo zone while continuing to clock the modulo-N counter 64 in FIG. 5A with the second clock 46. Adjusting the scaling factor of the frequency synthesizer 88 relative to the new servo zone will cause a transient in the asynchronous timing recovery shown in FIG. 6B. However, this transient will not significantly affect the synchronous timing recovery shown in FIG. 5A so that the second clock 46 will continue to write the spiral servo track to the second disk surface 16B substantially synchronous with the rotation of the disk as the first head 20A crosses over the servo zones on the first disk surface 16A.

Figure 5B:
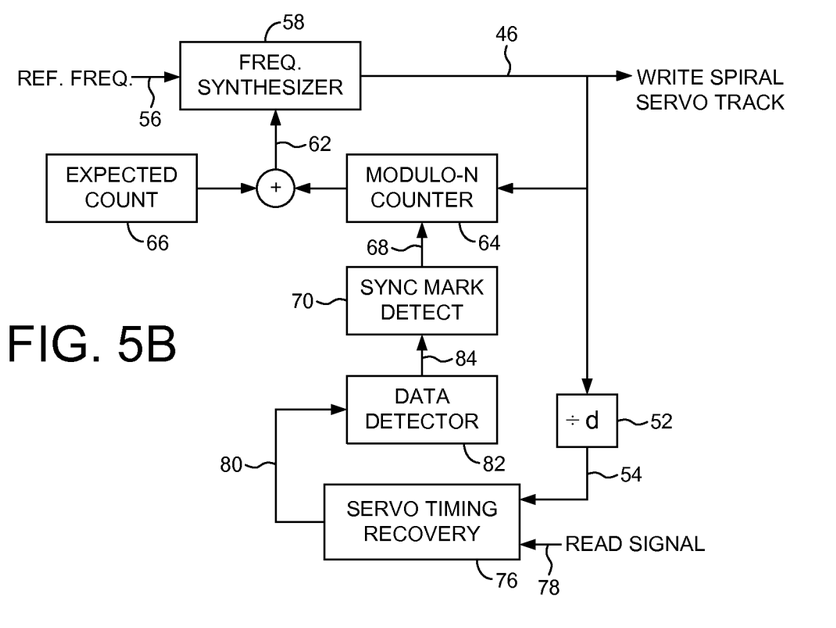
FIG. 5B shows an embodiment of the present invention wherein the second clock is generated by adjusting a fractional scalar within the frequency synthesizer in response to the phase error.

FIG. 5B shows an alternative embodiment of the present invention wherein the target frequency of the frequency synthesizer 58 (generated by its internal VCO) is output as the second clock 46 used to write the spiral servo track to the second disk surface. In this embodiment, the second phase error 62 adjusts a fractional scalar of the frequency synthesizer 58 so that the target frequency is substantially synchronized to the sync marks in the servo sectors. The external VCO 74 shown in FIG. 5A is unnecessary in this embodiment since the second phase error 62 comprises a relatively low frequency with a relatively low update rate (once per servo sector) that can be tracked by making the appropriate adjustment to the target frequency of the frequency synthesizer 58.

Any suitable control circuitry may be employed to implement the flow diagrams in the embodiments of the present invention, such as any suitable integrated circuit or circuits. For example, the control circuitry may be implemented within a read channel integrated circuit, or in a component separate from the read channel, such as a disk controller, or certain operations described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into a SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

What is claimed is:

1. A disk drive comprising:
  a first disk surface and a second disk surface, wherein the first disk surface comprises a plurality of servo sectors defining a plurality of concentric servo tracks, wherein:
    the concentric servo tracks form a plurality of servo zones; and
    a servo data rate of servo sectors in a first servo zone is different than a servo data rate of servo sectors in a second servo zone;
  a first head actuated over the first disk surface and a second head actuated over the second disk surface; and
  control circuitry operable to:
    read a first servo sector of the first disk surface using the first head to generate a read signal;
    process the read signal to generate a first phase error;
    generate a first clock at a frequency proximate the servo data rate of the first data sector;
    synchronize read signal samples in response to the first phase error and the first clock to generate synchronous samples;
    detect the servo data in the first servo sector in response to the synchronous samples;
    process the read signal to generate a second phase error;
    generate a second clock in response to the second phase error; and
    write a spiral servo track to the second disk surface using the second head and the second clock.

2. The disk drive as recited in claim 1, wherein a frequency of the second clock is substantially different than a frequency of the first clock.

3. The disk drive as recited in claim 1, wherein the first clock is generated in response to the second clock.

4. The disk drive as recited in claim 3, wherein the first clock is generated by scaling the second clock.

5. The disk drive as recited in claim 1, wherein the control circuitry is further operable to:
  sample the read signal to generate a plurality of sample values; and
  generate the first phase error based on a difference between one of the sample values and an expected value.

6. The disk drive as recited in claim 1, wherein the control circuitry is further operable to:
  detect a sync mark in the first servo sector; and
  generate the second phase error in response to the detected sync mark.

7. The disk drive as recited in claim 6, wherein the control circuitry is further operable to:
  clock a counter with the second clock; and
  generate the second phase error based on a value of the counter when the sync mark is detected.

8. The disk drive as recited in claim 7, wherein the control circuitry is further operable to:
  scale the second clock to generate a third clock;
  synchronize a frequency synthesizer to the third clock, wherein the frequency synthesizer generates a fourth clock by scaling the third clock, the scaling corresponding to a servo data rate of the current servo zone; and
  adjust the scaling when the first head crosses a servo zone boundary while continuing to clock the counter with the second clock.

9. The disk drive as recited in claim 8, wherein the control circuitry is further operable:

generate a fifth clock in response to a center frequency control signal generated by the frequency synthesizer;

sample the read signal using the fifth clock; and adjust a frequency of the fifth clock in response to the first phase error in order to generate the synchronous samples.

10. The disk drive as recited in claim 8, wherein the control circuitry is further operable:

sample the read signal using the fourth clock to generate the read signal samples; and interpolate the read signal samples using the first phase error in order to generate the synchronous samples.

11. A method of operating a disk drive, the disk drive comprising a first disk surface and a second disk surface, wherein the first disk surface comprises a plurality of servo sectors defining a plurality of concentric servo tracks, wherein the concentric servo tracks form a plurality of servo zones, and a servo data rate of servo sectors in a first servo zone is different than a servo data rate of servo sectors in a second servo zone, the disk drive further comprising a first head actuated over the first disk surface and a second head actuated over the second disk surface, the method comprising:

reading a first servo sector of the first disk surface using the first head to generate a read signal;

processing the read signal to generate a first phase error;

generating a first clock at a frequency proximate the servo data rate of the first data sector;

synchronizing read signal samples in response to the first phase error and the first clock to generate synchronous samples;

detecting the servo data in the first servo sector in response to the synchronous samples;

processing the read signal to generate a second phase error;

generating a second clock in response to the second phase error; and writing a spiral servo track to the second disk surface using the second head and the second clock.

12. The method as recited in claim 11, wherein a frequency of the second clock is substantially different than a frequency of the first clock.

13. The method as recited in claim 11, wherein the first clock is generated in response to the second clock.

14. The method as recited in claim 13, wherein the first clock is generated by scaling the second clock.

15. The method as recited in claim 11, further comprising:

sampling the read signal to generate a plurality of sample values; and generating the first phase error based on a difference between one of the sample values and an expected value.

16. The method as recited in claim 11, further comprising:

detecting a sync mark in the first servo sector; and generating the second phase error in response to the detected sync mark.

17. The method as recited in claim 16, further comprising:

clocking a counter with the second clock; and generating the second phase error based on a value of the counter when the sync mark is detected.

18. The method as recited in claim 17, further comprising:

scaling the second clock to generate a third clock;

synchronizing a frequency synthesizer to the third clock, wherein the frequency synthesizer generates a fourth clock by scaling the third clock, the scaling corresponding to a servo data rate of the current servo zone; and adjusting the scaling when the first head crosses a servo zone boundary while continuing to clock the counter with the second clock.

19. The method as recited in claim 18, further comprising:

generating a fifth clock in response to a center frequency control signal generated by the frequency synthesizer;

sampling the read signal using the fifth clock; and adjusting a frequency of the fifth clock in response to the first phase error in order to generate the synchronous samples.

20. The method as recited in claim 18, further comprising:

sampling the read signal using the fourth clock to generate the read signal samples; and interpolating the read signal samples using the first phase error in order to generate the synchronous samples.

* * * * *